United States Patent
Kasuya

(10) Patent No.: US 6,632,336 B2
(45) Date of Patent: Oct. 14, 2003

(54) ACIDIC LIQUID ATOMIZER

(75) Inventor: Shoji Kasuya, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 09/922,956

(22) Filed: Aug. 7, 2001

(65) Prior Publication Data

US 2002/0038768 A1 Apr. 4, 2002

(30) Foreign Application Priority Data

Aug. 9, 2000 (JP) .......................................... 2000-241387

(51) Int. Cl.⁷ ................................................ C02F 1/461
(52) U.S. Cl. ...................................... 204/271; 204/275.1
(58) Field of Search ............................... 204/271, 275.1

(56) References Cited

U.S. PATENT DOCUMENTS 3,996,126 A    12/1976  Rasmussen .................. 204/271
5,858,201 A  *  1/1999  Otsuka et al. ............... 205/701

FOREIGN PATENT DOCUMENTS

| EP | 0792584 A1 | 9/1997 | .......... A01N/59/00 |
| JP | 08-024863 | 1/1996 | ............. C02F/1/46 |
| JP | 09-174054 | 7/1997 | ............. C02F/1/46 |

\* cited by examiner

*Primary Examiner*—Arun S. Phasge
(74) *Attorney, Agent, or Firm*—Harness, Dickey & Pierce, P.L.C.

(57) ABSTRACT

A portable acidic water atomizer includes a casing; a source liquid tank provided within the casing; an electrolytic bath, for electrolyzing the supplied source liquid into acidic water and alkaline water; a pump for supplying source liquid within the source liquid tank to the electrolytic bath; an atomizing unit for spraying acidic water created in the electrolytic bath to outside of the casing; a waste liquid pipe, connecting the electrolyte bath and the waste liquid tank, for drawing alkaline liquid created by the electrolytic bath to a waste liquid tank; a control unit for controlling operation of the atomizing unit, the electrolytic bath, and the pump; and a power supply for driving the pump, electrolytic bath, atomizing unit and control unit.

36 Claims, 2 Drawing Sheets

US 6,632,336 B2

ACIDIC LIQUID ATOMIZER

This nonprovisional application claims priority under 35 U.S.C. 119(a) on Patent Application No. 2000-241387 filed in Japan on Aug. 9, 2000, which is herein incorporated by reference.

BACKGROUND OF THE INVENTION

1. Field of the Invention

The present invention relates to an atomizer for obtaining acidic water by electrolyzing an inorganic salt solution.

2. Description of Related Art

Technology where electrolytic water is produced using an electrolytic bath either with or without a membrane is known (Japanese Patent Application Laid-open No. Hei 11-90442 and Japanese Patent Laid-open Publication Hei. 6-246272).

Anode electrolytic water created on the anode side includes hypochlorous acid. The strong oxidation and chlorination operation of the hypochlorous acid can be utilized in sterilization and disinfection. This kind of utilization method is widely employed with medical equipment, for example. Minute amounts of ozone and dissolved oxygen included in the hypochlorous acid cause a granulation generation accelerating operation and research is therefore being carried out into utilizing this to provide assistance in surgical treatment. Further, it is well known that the beneficial action of electrolytic water decreases with the passage of time after being manufactured. It is therefore preferable for the electrolytic water to be used directly after being made.

Devices for manufacturing electrolytic water are equipped with an electrolytic bath and pump etc. and are therefore relatively large items installed in hospitals, etc.

SUMMARY OF THE INVENTION

It is therefore an object of the present invention to provide an electrolytic water manufacturing device.

It is also an object of the present invention to provide an electrolytic water manufacturing device that can be used by individuals, and where just the required amount of electrolytic water can be provided directly after production at arbitrary times.

It is also an object of the present invention to provide an electrolytic water manufacturing device that provides electrolytic water which can be used directly after being made.

In order to resolve the aforementioned problems and achieve one or more of the aforementioned objects, the present invention provides an acidic water atomizer capable of providing arbitrary amounts of acidic water in a portable manner and at arbitrary times and locations. The present invention for achieving one or more of the aforementioned objects is described below:

(1) an acidic liquid atomizer, comprises a casing, a source liquid tank, a pump, an electrolytic bath, an atomizing unit, a waste liquid tank, a waste liquid pipe, a control unit, and a power supply. The source liquid tank is provided within the casing. The electrolytic bath is for electrolyzing the supplied source liquid into acidic water and alkaline water. The pump is for supplying source liquid within the source liquid tank to the electrolytic bath. The atomizing unit is for spraying acidic water created in the electrolytic bath outside of the casing. The waste liquid pipe connects the electrolyte bath and the waste liquid tank and is for drawing alkaline liquid created by the electrolytic bath to a waste liquid tank. The control unit is for controlling operation of the atomizing unit, the electrolytic bath, and the pump. The power supply drives the pump, electrolytic bath, atomizing unit and control unit.

(2) The source liquid tank may be located above the pump, and the waste liquid tank may be located below the pump in the acidic water atomizer of the present invention.

(3) The atomizing unit of the acidic water atomizer may include a piezo-oscillator fitted to a perforated plate.

In one embodiment of the present invention, the acidic water is used for skin rejuvenation and/or hydration.

DETAILED DESCRIPTION OF THE PREFERRED EMBODIMENTS

The following is a detailed description, with reference to the drawings, of the present invention.

Figure 1:
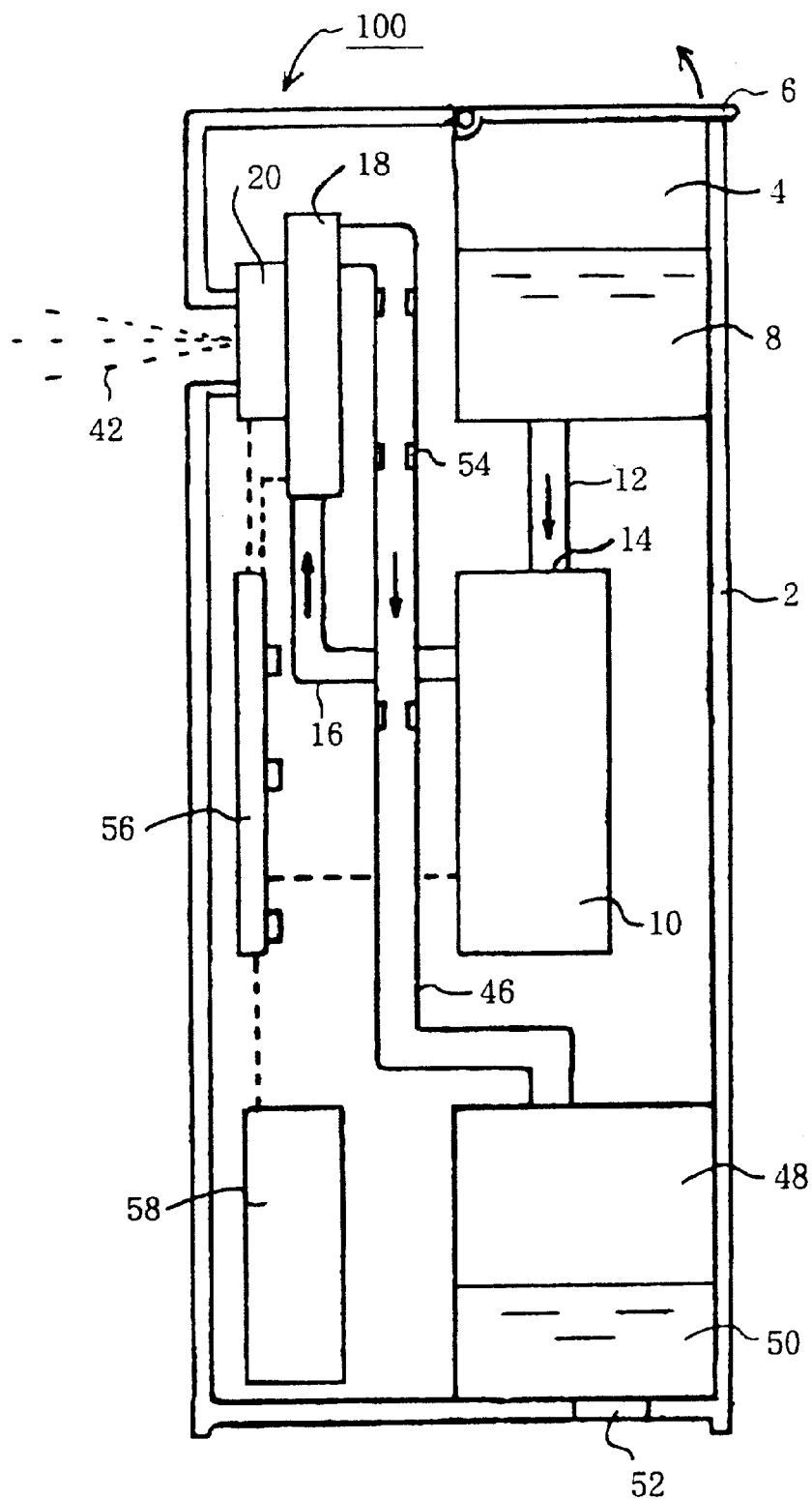
FIG. 1 a view showing an exemplary configuration an acidic water atomizer in one embodiment of the present invention.

FIG. 1 is an outline showing an example of an acidic water atomizer of the present invention. In FIG. 1, numeral 100 indicates an acidic water atomizer, with a synthetic resin casing 2 being formed substantially in the shape of a rectangular parallelepiped. A source liquid tank 4 is formed at an upper part within the casing 2. A water supply cover 6 is formed at the upper part of the source liquid tank 4. Electrolyte source liquid 8 can then be supplied to within the source liquid tank from outside of the casing 2 by opening the cover 6.

A pump 10 is located towards the lower end of the source liquid tank 4. Electrolyte source liquid within the source liquid tank 4 can then be supplied to a water absorption opening 14 of the pump 10 via a source liquid supply pipe 12. Electrolyte source liquid 8 supplied to the pump 10 is then sent under pressure by the pump 10 to an electrolytic bath 18 via a delivery pipe 16.

Figure 2:
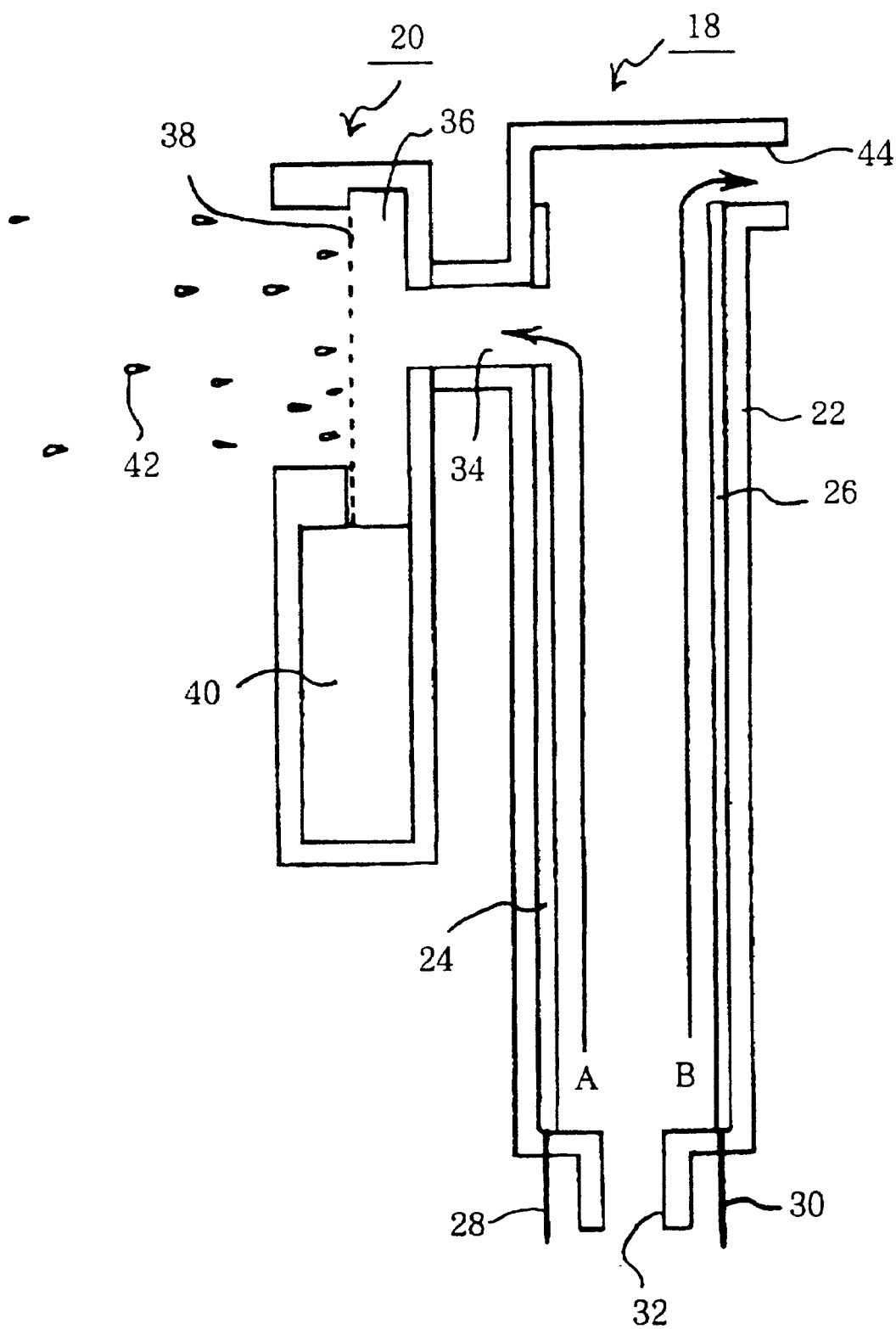
FIG. 2 is an enlarged view showing the structure of the electrolytic bath and atomizing unit of FIG. 1.

FIG. 2 is an enlarged view showing an electrolytic bath 18 and atomizing unit 20 (described later) connected to the electrolytic bath 18. The electrolytic bath 18 has an anode 24 and a cathode 26 located in parallel with respect to each other within an electrolytic bath casing 22. Numeral 28 indicates an anode terminal connected to the anode 24 and numeral 30 indicates a cathode terminal connected to the cathode 26.

Electrolyte source liquid supplied from the pump 10 is supplied to within the electrolytic bath 18 from an inflow port 32 formed in a lower part of the electrolytic bath 18. When the electrolyte source liquid moves towards the top of the electrolytic bath 18 while maintaining a laminar flow, acidic water is created in the vicinity of the anode 24 and alkaline water is created in the vicinity of the cathode 26 as a result of electrolysis resulting from the application of a voltage across the anode 24 and the cathode 26.

The electrolyte source liquid within the electrolytic bath 18 flows as a laminar flow. The generated acidic water therefore flows upwards as shown by arrow A along the surface of the anode 24 and substantially only acidic water is supplied to an atomizing chamber 36 of the atomizing unit 20 via an extraction hole 34 formed at a side of the upper part of the electrolytic bath 18.

Numeral 38 indicates a perforated plate separating the atomizing chamber 36 of the atomizing unit 20 from the outside. The perforated plate 38 has a multiplicity of pores having diameters of 18 to 24 µm, and is fixed to a piezo-oscillator 40. The perforated plate 38 coupled to the piezo-oscillator 40 therefore oscillates when the piezo-oscillator 40 is made to oscillate as a result of the application of an alternating current or a pulse voltage. Acidic water filling up the atomizing chamber 36 is then sprayed outside the acidic water atomizer as fine droplets 42 via the pores formed in the perforated plate 38.

Alkaline water created within the electrolytic bath 18 moves upwards along the cathode 26, as shown by the arrow B in FIG. 2, is sent to a waste liquid tank 48 provided at the lower part of the pump 10 along a waste liquid pipe 46 coupled to a waste liquid opening 44, and is temporarily stored as waste liquid 50 (refer to FIG. 1). Numeral 52 is a waste liquid extraction hole formed at the lower part of the waste liquid tank 48.

The waste liquid pipe 46 has a relatively large diameter compared with the amount of waste liquid flowing within it. When waste liquid is flowing through the pipe, waste liquid only flows through part of the diameter-direction cross-section of the waste liquid pipe 46 and does not occupy the whole cross-section of the waste liquid pipe 46. The endless sucking in of source liquid into the waste liquid tank 48 can therefore be prevented by employing a siphoning operation based on the head difference of the source liquid tank 4 and the waste liquid tank 48 due to the waste liquid pipe 46 having a large diameter.

Numeral 54 indicates a plurality of reverse flow preventing rings (three in the drawing, but another number of reverse flow preventing rings could also be utilized) inserted into the waste liquid pipe 46, with these rings 54 narrowing the internal diameter of the waste liquid pipe 46 (in the example shown, the diameter is narrowed by half, however this amount is merely exemplary). The waste liquid 50 within the waste liquid tank 48 therefore does not flow in reverse directly into the electrolytic bath 18 even if the acidic water atomizer 100 of the present invention tilts during use, due to the rings 54.

Numeral 56 indicates a control unit incorporating a microprocessor, for controlling the pump 10, electrolytic bath 18 and atomizing unit 20, etc. Numeral 58 indicates a power supply for supplying power to the control unit 56, pump 10, electrolytic bath 18 and atomizing unit 20, etc. Either a primary battery or a secondary battery may be employed as a driving supply.

An acidic water atomizer of the configuration shown in FIG. 1 employs a 5 cm×5 cm×18 cm casing. An electrolytic bath where two 20 mm×23.6 mm rectangular platinum electrodes are lined up in parallel spaced by 0.18 mm is employed. The volume of liquid sent by the pump is 25 ml/min, and the electrolytic current density is 0.0286 A/cm$^2$.

It is obvious to one of ordinary skill in the art, that the parameters listed above are exemplary and could be modified, such modifications still being within the scope of the present invention.

Sodium chloride solution of a concentration of 2500 ppm is employed as the electrolyte source liquid.

It is also obvious to one of ordinary skill in the art, that the solution and the concentration listed above are exemplary and could be modified, such modifications still being within the scope of the present invention.

The pump 10 is made to operate by turning on a power supply switch (not shown) and the electrolyte source liquid 8 within the source liquid tank 4 is sent to the electrolytic bath 18 and electrolyzed. Acidic water generated by electrolysis is sprayed to outside via the perforated plate 38 of the atomizing unit 20. Alkaline water is sent from the electrolytic bath 18 to the waste liquid tank 48 via the waste liquid pipe 46. Spraying of the acidic water can be stopped by turning off the power supply switch.

The acidic water atomizer of the present invention is housed within a small casing. This provides useful portability and enables use in arbitrary locations. As acidic water is made during use, there is no need to worry about a reduction in the operation of the acidic water with the passage of time.

Further, when the source liquid tank is located above the pump and the waste liquid tank is located below the pump, the pump is usually filled with source liquid and it is therefore difficult for air locks to occur.

Moreover, a siphoning effect can be prevented when a large diameter waste liquid pipe is employed and reverse flow prevention rings are fitted to the waste liquid pipe.

Although the present invention has been described above in conjunction with the configurations of FIGS. 1 and 2, the present invention should not be limited to these configurations. For example, although the casing 2 has been described as being made of a synthetic resin in the shape of a rectangular parallelepiped, the casing may be made of other materials in other shapes, as would be known to one of ordinary skill in the art.

Further, although the source liquid tank 4 water supply cover 6 have been described as being formed at an upper part within the casing 2, these elements may be located elsewhere in the casing 2, as would be evident to one of ordinary skill in the art. Still further, although the electrolyte source liquid 8 is described as be supplied to the casing 2 via cover 6, any other mechanism known to one of ordinary skill in the art could also be used to supply the electrolyte source liquid 8 to the casing 2.

Still further, although the pump 10 has been described as being formed at a lower end within the casing 2, this element may be located elsewhere in the casing 2, as would be evident to one of ordinary skill in the art. Still further, although the anode 24 and cathode 26 have been described as being in parallel with respect to each other, they may also be substantially parallel, as would be known to one of ordinary skill in the art, in order to obtain the desired effect.

Still further, although the atomizing unit 20 has been described as including a perforated plate 38 and a piezo-oscillator 40, any other unit for achieving the desired droplets could also be utilized as would be known to one of ordinary skill in the art.

It is noted that the head difference obtained is above is obtained based on a difference in pipe diameters. However, it is noted that other techniques for obtaining a head difference are also within the skill of the ordinary artisan, and therefore also within the scope of the present invention. Similarly, a siphoning effect is reduced above using at least one reverse flow prevention ring. However, it is noted that other techniques for reducing the siphoning effect are also within the skill of the ordinary artisan, and therefore also within the scope of the present invention. It is also noted that although FIGS. 1 and 2, describe various openings, holes, ports, pipes, tanks, pumps, units, and power supplies, the nature and arrangement of the elements as described above is exemplary, and these elements may be replaced, augmented reconfigured and/or relocated, as would be evident to one of ordinary skill to obtain the desired effect. Such modifications are contemplated as being with the level of one of ordinary skill in the art, and therefore within the scope of the present invention.

What is claimed is:

1. An acidic liquid atomizer, comprising:
   a casing;
   an electrolytic bath for electrolyzing a source liquid into acidic water and alkaline water;
   a pump for supplying the source liquid to the electrolytic bath;
   a source liquid tank located above the pump within the casing to contain the source liquid, the source liquid tank being positioned in a vertical orientation with respect to the pump;
   an atomizing unit for spraying the acidic water created in the electrolytic bath outside of the casing;
   means for reducing the occurrence of a siphoning effect between the source liquid tank and a waste liquid tank;
   a control unit for controlling operation of at least one of the atomizing unit, the electrolytic bath, and the pump; and
   a power supply for driving at least one of the pump, electrolytic bath, atomizing unit and control unit.

2. The acidic liquid atomizer of claim 1, wherein the waste liquid tank is located below the pump.

3. The acidic liquid atomizer of claim 1, wherein the atomizing unit employs a piezo-oscillator fitted to a perforated plate.

4. The acid liquid atomizer of claim 3, wherein said perforated plate has a plurality of pores having diameter of from 18 $\mu$m to 24 $\mu$m.

5. The acidic liquid atomizer of claim 1, said means including at least one reverse fib prevention ring fitted to a waste liquid pipe to reduce the occurrence of the siphoning effect.

6. The acid liquid atomizer of claim 1, wherein said atomizing unit is located adjacent to said source liquid tank.

7. The acid liquid atomizer of claim 1, wherein said casing is a synthetic resin casing substantially in the shape of a rectangular parallelepiped.

8. The acidic liquid atomizer of claim 1, wherein said acid liquid atomizer is portable.

9. The acid liquid atomizer of claim 1, said means for reducing including a waste liquid pipe having a cross-section having a diameter sufficiently large so that waste liquid flowing through said waste liquid pipe does not occupy the entire cross-section of said waste liquid pipe.

10. The acid liquid atomizer of claim 9, wherein a reverse flow of waste liquid can be reduced by employing a siphoning operation based on a head difference of said source tank and said waste liquid tank.

11. The acidic liquid atomizer of claim 9, said means for reducing further including at least one reverse flow prevention ring fitted to a waste liquid pipe to reduce the occurrence of the siphoning effect.

12. The acid liquid atomizer of claim 1, wherein aid electrolytic bath includes a cathode and an anode in a substantially parallel configuration.

13. The acid of claim 12, wherein said electrolyte source liquid flows as a laminar flow.

14. A portable acidic liquid atomizer, comprising:
   a casing;
   an electrolytic bath for electrolyzing a source liquid into acidic water and alkaline water; a pump for supplying the source liquid to the electrolytic bath;
   a source liquid tank located above the pump within the casing to contain the source liquid, the source liquid tank being positioned vertically with respect to the pump to reduce the occurrence of an air lock;
   an atomizing unit for spraying the acidic water created in the electrolytic bath outside of the casing;
   means for reducing the of a siphoning effect between the source liquid tank and a waste liquid tank;
   a control unit for controlling operation of at least one of the atomizing unit, the electrolytic bath, and the pump; and
   a power supply for driving at least one of the pump, electrolytic bath, atomizing unit and control unit.

15. The acidic liquid atomizer of claim 14, said means for reducing including at least one reverse flow prevention ring filtered to a waste liquid pipe to reduce the occurrence of the siphoning effect.

16. The acid liquid atomizer of claim 14, said means for reducing including a waste liquid pipe having a cross-section having a diameter sufficiently large so that waste liquid flowing through said waste liquid pipe does not occupy the entire cross-section of said waste liquid pipe.

17. The acid liquid atomizer of claim 16, wherein a reverse flow of waste liquid can be reduced by employing a siphoning operation based on a head difference of said source tank and said waste liquid tank.

18. The acidic liquid atomizer of claim 16, aid means for reducing further including at least one reverse flow prevention ring fitted to a waste liquid pipe to reduce the occurrence of the siphoning effect.

19. An acidic liquid atomizer, comprising:
   a casing;
   an electrolytic bath for electrolyzing a source liquid into acidic water and alkaline water;
   a pump for supplying the source liquid to the electrolytic bath;
   a source liquid tank located above the pump within the casing to contain the source liquid, the source liquid tank being positioned in a vertical orientation with respect to the pump; and
   an atomizing unit for spraying the acidic water created in the electrolytic bath outside of the casing;
   wherein the atomizing unit and the source liquid tank are at substantially the same height within the acidic liquid atomizer, and above said pump.

20. The acidic liquid atomizer of claim 19, further comprising:
   a waste liquid pipe connection the electrolytic bath and a waste liquid tank for drawing alkaline liquid created by the electrolytic bath to the waste liquid tank;
   a control unit for controlling operation of at least one of the atomizing unit, the electrolytic bath, and the pump; and
   a power supply for driving at least one of the pump, electrolytic bath, atomizing unit and control unit.

21. The acidic liquid atomizer of claim 17, wherein the waste liquid tank is located below the pump.

22. The acidic liquid atomizer of claim 19, wherein the atomizing unit employs a piezo-oscillator fitted to a perforated plate.

23. The acid liquid atomizer of claim 22, wherein said perforated plate has a plurality of pores having diameter of from 18 $\mu$m to 24 $\mu$m.

24. The acidic liquid atomizer of claim 19, wherein said acid liquid atomizer is portable.

25. The acidic liquid atomizer of claim 19, further comprising at least one reverse flow prevention ring fitted to a waste liquid pipe to reduce the occurrence of a siphoning effect.

26. The acid liquid atomizer of claim 19, wherein said casing is a synthetic resin casing substantially in the shape of a rectangular parallelepiped.

27. The acid liquid atomizer of claim 19, further comprising a waste liquid pipe having a cross-section having a diameter sufficiently large so that waste liquid flowing through said waste liquid pipe does not occupy the entire cross-section of said waste liquid pipe.

28. The acid liquid atomizer of claim 27, wherein a reverse flow of waste liquid can be prevented by employing a siphoning operation based on a head difference of said source tank and said waste liquid tank.

29. The acidic liquid atomizer of claim 27, further comprising at least one reverse flow prevention ring fitted to the waste liquid pipe to reduce the occurrence of the siphoning effect.

30. The acid liquid atomizer of claim 19, wherein aid electrolytic bath includes a cathode and an anode in a substantially parallel configuration.

31. The acid liquid atomizer of claim 30, wherein said electrolyte source liquid flows as a laminar flow.

32. A portable acidic liquid atomizer, comprising:

a casing;

an electrolytic bath for electrolyzing a source liquid into acidic water and alkaline water;

a pump for supplying the source liquid to the electrolytic bath;

a source liquid tank located above the pump within the casing to contain the source liquid, the source liquid tank being positioned vertically with respect to the pump to reduce the occurrence of an air lock; and an atomizing unit for spraying the acidic water created in the electrolytic bath outside of the casing;

wherein the atomizing unit and the source liquid tank are at substantially the same height within the acidic liquid atomizer, and above said pump.

33. The acidic liquid atomizer of claim 32, further comprising at least one reverse flow prevention ring fitted to a waste liquid pipe to reduce the occurrence of a siphoning effect.

34. The acid liquid atomizer of claim 32, further comprising a waste liquid pipe having a cross-section having a diameter sufficiently large so that waste liquid flowing through said waste liquid pipe does not occupy the entire cross-section of said waste liquid pipe.

35. The acid liquid atomizer of claim 34, wherein a reverse flow of waste liquid can be prevented by employing a siphoning operation based on a head difference of said source tank and said waste liquid tank.

36. The acidic liquid atomizer of claim 34, further comprising at least one reverse flow prevention ring fitted to the waste liquid pipe to reduce the occurrence of the siphoning effect.

* * * * *